US011726918B2

United States Patent
Alsop et al.

(10) Patent No.: US 11,726,918 B2
(45) Date of Patent: Aug. 15, 2023

(54) DYNAMICALLY COALESCING ATOMIC MEMORY OPERATIONS FOR MEMORY-LOCAL COMPUTING

(71) Applicant: ADVANCED MICRO DEVICES, INC., Santa Clara, CA (US)

(72) Inventors: Johnathan Alsop, Bellevue, WA (US); Alexandru Dutu, Bellevue, WA (US); Shaizeen Aga, Santa Clara, CA (US); Nuwan Jayasena, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 17/361,145

(22) Filed: Jun. 28, 2021

(65) Prior Publication Data

US 2022/0414013 A1    Dec. 29, 2022

(51) Int. Cl.
*G06F 12/0871*  (2016.01)
*G06F 12/02*    (2006.01)
*G06F 12/084*   (2016.01)
*G06F 12/0846*  (2016.01)

(52) U.S. Cl.
CPC ...... *G06F 12/0871* (2013.01); *G06F 12/0238* (2013.01); *G06F 12/084* (2013.01); *G06F 12/0846* (2013.01)

(58) Field of Classification Search
CPC .............. G06F 12/0238; G06F 12/084; G06F 12/0846; G06F 12/0871
See application file for complete search history.

(56) References Cited

U.S. PATENT DOCUMENTS

| | | | | |
|---|---|---|---|---|
| 8,838,900 B2 * | 9/2014 | Lin | ......................... | G06F 12/00 711/124 |
| 2010/0318741 A1 * | 12/2010 | Scott | ................... | G06F 12/0817 711/E12.001 |
| 2014/0006685 A1 * | 1/2014 | Peterson | ............. | G06F 12/0238 711/102 |
| 2014/0181421 A1 * | 6/2014 | O'Connor | ................ | G06F 9/50 711/148 |

(Continued)

FOREIGN PATENT DOCUMENTS

GB          2527529 A     12/2015

OTHER PUBLICATIONS

Boroumand et al., "LazyPIM: an Efficient Cache Coherence Mechanism for Processing-in-Memory," IEEE Computer Architecture Letters, vol. 16, Issue 1, DOI: 10.1109/LCA.2016.2577557, Date of Publication: Jun. 7, 2016, 4 pages.

(Continued)

*Primary Examiner* — Aracelis Ruiz

(57) ABSTRACT

Dynamically coalescing atomic memory operations for memory-local computing is disclosed. In an embodiment, it is determined whether a first atomic memory access and a second atomic memory access are candidates for coalescing. In response to a triggering event, the atomic memory accesses that are candidates for coalescing are coalesced in a cache prior to requesting memory-local processing by a memory-local compute unit. The atomic memory accesses may be coalesced in the same cache line or atomic memory accesses in different cache lines may be coalesced using a multicast memory-local processing command.

20 Claims, 10 Drawing Sheets

(56) References Cited

U.S. PATENT DOCUMENTS

2014/0366033 A1* 12/2014 Nystad ............... G06F 12/0284
  718/104
2015/0046655 A1   2/2015 Nystad et al.
2018/0300846 A1  10/2018 Ray et al.
2019/0324905 A1  10/2019 Ros et al.

OTHER PUBLICATIONS

Mukkara et al., "Phi: Architectural Support for Synchronization- and Bandwidth-Efficient Commutative Scatter Updates," In Proceedings of the 52nd Annual IEEE/ACM International Symposium on Microarchitecture, (MICRO-52), Oct. 12-16, 2019, Columbus, OH, USA, pp. 1009-1022.

Nai et al., "GraphPIM: Enabling Instruction-Level Pim Offloading in Graph Computing Frameworks," In 2017 IEEE International Symposium on High Performance Computer Architecture (HPCA), 2017, pp. 457-468.

Ahn et al., PIM-Enabled Instructions: a Low-Overhead, Locality-Aware Processing-in-Memory Architecture, XP058511828, Proceedings of the 2015 ACM International Joint Conference on Pervasive and Ubiquitous Computing, Jun. 13, 2015, pp. 336-348, ACMPUB27, USA.

Hadidi et al., CAIRO: a Compiler-Assisted Technique for Enabling Instruction-Level Offloading of Processing-in-Memory, XP058672917, ACM Transactions on Architecture and Code Optimization, Dec. 20, 2017, 25 pages, vol. 14, No. 4, Article 48, US.

International Search Report and Written Opinion, PCT/US2022/035142, dated Oct. 26, 2022, 14 pages.

* cited by examiner

Determine Whether A First Atomic Memory Access And A Second Atomic Memory Access Are Candidates For Coalescing 210

Determine Whether The First Atomic Memory Access Can Be Coalesced With The Second Atomic Memory Access Based On A Symmetric Access To Different Memory Modules 710

Determine, In Response To A Triggering Event, Whether A First Cache Line That Includes The First Atomic Memory Access Can Be Coalesced With A Second Cache Line That Includes The Second Atomic Memory Access, Wherein The First Cache Line And The Second Cache Line Are In A Special Cache State 810

Coalesce The First Atomic Memory Access And The Second Atomic Memory Access In A Cache Prior To Requesting Memory-Local Processing By A Memory-Local Compute Unit 220

FIG. 8

DYNAMICALLY COALESCING ATOMIC MEMORY OPERATIONS FOR MEMORY-LOCAL COMPUTING

BACKGROUND

Computing systems often include a number of processing resources (e.g., one or more processors), which may retrieve and execute instructions and store the results of the executed instructions to a suitable location. A processing resource (e.g., central processing unit (CPU) or graphics processing unit (GPU)) can comprise a number of functional units such as arithmetic logic unit (ALU) circuitry, floating point unit (FPU) circuitry, and/or a combinatorial logic block, for example, which can be used to execute instructions by performing arithmetic operations on data. For example, functional unit circuitry may be used to perform arithmetic operations such as addition, subtraction, multiplication, and/or division on operands. Typically, the processing resources (e.g., processor and/or associated functional unit circuitry) may be external to a memory device, and data is accessed via a bus or interconnect between the processing resources and the memory device to execute a set of instructions. To reduce the amount of accesses to fetch or store data in the memory device, computing systems may employ a cache hierarchy that temporarily stores recently accessed or modified data for use by a processing resource or a group of processing resources. However, processing performance may be further improved by offloading certain operations to a memory-based execution device in which processing resources are implemented internal and/or near to a memory, such that data processing is performed closer to the memory location storing the data rather than bringing the data closer to the processing resource. A near-memory or in-memory compute device may save time by reducing external communications (i.e., host to memory device communications) and may also conserve power.

BRIEF DESCRIPTION OF THE DRAWINGS

FIG. 8 sets forth a flow chart illustrating another example method of dynamically coalescing atomic memory operations for memory-local computing in accordance with some embodiments of the present disclosure.

DETAILED DESCRIPTION

Figure 1:
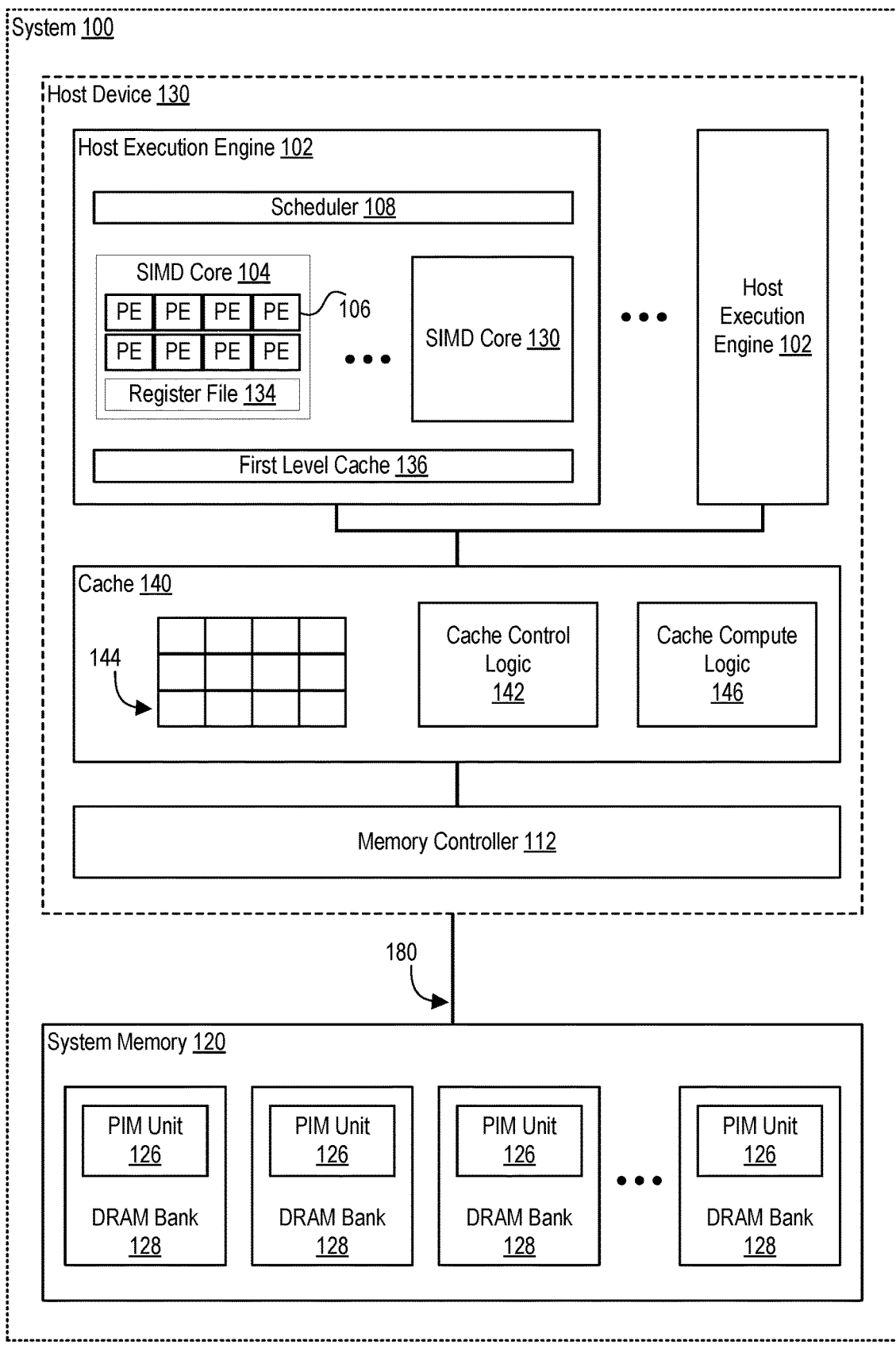
FIG. 1 sets forth a block diagram of an example system for dynamically coalescing atomic memory operations for memory-local computing in accordance with some embodiments of the present disclosure.

As compute throughput scales faster than memory bandwidth, many techniques have been proposed to keep the growing compute capacity fed with data. In particular, memory-local processing hardware such as processing-in-memory (PIM) hardware moves compute close to memory, availing logic close to memory the benefit of higher memory bandwidth than that available to the host.

Atomic memory accesses such as read-modify-write (RMW) operations, commonly used in many sparse/irregular applications, exhibit potential for PIM acceleration. These operations take an operand, perform some operation with it and a target piece of data in memory, and store the result to the same location in memory. In a non-PIM system, this requires two transfers across the memory interface: one to load the data from memory to host where it is operated on with the input operand, and one to store the result from the host to memory. In a PIM system, performing the operation in PIM would reduce the number of transfers from 2 to 1: sending the host operand from host to memory, where a load and store to the target location data can be performed locally in memory. The resulting 2x throughput increase has the potential to greatly improve performance for atomic-heavy workloads, which are often limited by memory bandwidth.

However, atomic-heavy workloads are often sparse or irregular, which poses a problem for PIM implementations in at least two ways. First, irregularity makes it difficult to predict whether a given access will hit in the cache for some applications (e.g., graph analytics, sparse machine learning). Because PIM only provides benefit for RMW accesses that miss in the caches and must go to memory (it can degrade performance if the access would otherwise hit in the cache), using PIM for all RMW accesses can end up degrading performance for applications with high locality. That is, PIM loses any cache locality that may have been possible in a host-based implementation (i.e., the host access may be cheaper than the PIM access). For many irregular atomics accesses, statically identifying the accesses that hit in the cache would be infeasible. Thus, it would be advantageous to decide dynamically at runtime whether or not to use PIM for these irregular atomics.

In addition, in some PIM implementations, a fine-grained PIM command occupies the same amount of command bus bandwidth as a standard memory operation. As a result, improving throughput with PIM requires that a PIM operation is multicast to multiple memory modules simultaneously (e.g., via a shared command bus). This can be difficult for atomic-heavy applications, which often exhibit high irregularity (e.g., push-based graph analytics, sparse machine learning, etc.). For a bank-local PIM implementation, a multicast PIM command must perform the same operation on the same column index in all target banks from the row buffer, and if it contains an immediate data operand, that operand must be the same for all banks. It is infeasible to statically detect multicast opportunities in irregular workloads; and in fact, most multicast command opportunities may come from disparate threads concurrently sending updates to addresses with the same column index.

Embodiments in accordance with the present disclosure are directed to dynamically coalescing atomic memory operations for memory-local computing. Embodiment in accordance with the present disclosure include cache line coalescing, which is a mechanism for dynamically coalescing multiple pending atomics to the same cache line in order to exploit atomic cache locality and reuse before implementing any operation in memory-local computing. Embodiments in accordance with the present disclosure also include multi-module coalescing, which is a mechanism for dynamically coalescing pending atomics to different cache lines into a single multicast memory-local processing command.

An embodiment is directed to a method of dynamically coalescing atomic memory operations for memory-local computing. The method includes determining whether a first atomic memory access and a second atomic memory access are candidates for coalescing. The method also includes coalescing the first atomic memory access and the second atomic memory access in a cache prior to requesting memory-local processing by a memory-local compute unit. In some cases, the memory local compute unit is a processing-in-memory (PIM) unit. Coalescing the first atomic memory access and the second atomic memory access in a cache may be carried out prior to issuing a coalesced multicast request (e.g., in order to request memory-local processing by memory-local compute units).

In some implementations, the method further includes determining that the first atomic memory access is a candidate for coalescing, allocating a cache line in a special state without loading data from memory, storing an operand of the first atomic memory access in the cache line at a location targeted by the first atomic memory access. In these implementations, determining whether a first atomic memory access and a second atomic memory access are candidates for coalescing may include determining that the second atomic memory access is a candidate for coalescing with the first atomic memory access. In these implementations, coalescing the first atomic memory access and the second atomic memory access in a cache prior to requesting memory-local processing by a memory-local compute unit may include coalescing the first atomic memory access and the second atomic memory access by performing an operation of the second atomic memory access, using an operand of the second atomic memory access, on data at a location in the cache line targeted by the second atomic memory access.

In some implementations, the method also includes sending, to a memory controller in response to a triggering event, one or more memory-local processing commands for the first atomic memory access and the second atomic memory access. In some implementations, the method also includes determining, based on one or more metrics, whether to allocate the cache line in the special state for the first atomic memory access.

In some implementations, determining whether a first atomic memory access and a second atomic memory access are candidates for coalescing includes determining whether the first atomic memory access can be coalesced with the second atomic memory access based on a symmetric access to different memory modules. In these implementations, determining whether the first atomic memory access can be coalesced with the second atomic memory access based on a symmetric access to different memory modules may include determining, in response to a triggering event, whether a first cache line that includes the first atomic memory access can be coalesced with a second cache line that includes the second atomic memory access, where the first cache line and the second cache line are in a special cache state. In some cases, the cache lines that are candidates for coalescing may be tracked in a separate physical structure.

In some implementations, coalescing the first atomic memory access and the second atomic memory access in the cache prior to requesting memory-local processing by the memory-local compute unit includes coalescing the first atomic memory access and the second atomic memory access using a multi-module memory-local processing command.

Another embodiment is directed to a computing device for dynamically coalescing atomic memory operations for memory-local computing. The computing device includes logic circuitry configured to determine whether a first atomic memory access and a second atomic memory access are candidates for coalescing and coalesce the first atomic memory access and the second atomic memory access in a cache prior to requesting memory-local processing by a memory-local compute unit. In some cases, the memory-local compute unit is a PIM unit.

In some implementations, the logic circuitry is further configured to determine that the first atomic memory access is a candidate for coalescing, allocate a cache line in a special state without loading data from memory, and store an operand of the first atomic memory access in the cache line at a location targeted by the first atomic memory access. In some implementations, determining whether a first atomic memory access and a second atomic memory access are candidates for coalescing includes determining that the second atomic memory access is a candidate for coalescing with the first atomic memory access. In these implementations, coalescing the first atomic memory access and the second atomic memory access in a cache prior to requesting memory-local processing by a memory-local compute unit may include coalescing the first atomic memory access and the second atomic memory access by performing an operation of the second atomic memory access, using an operand of the second atomic memory access, on data at a location in the cache line targeted by the second atomic memory access. These implementations may further include sending, to a memory controller in response to a triggering event, one or more memory-local processing commands for the first atomic memory access and the second atomic memory access.

In some implementations, determining whether a first atomic memory access and a second atomic memory access are candidates for coalescing includes determining whether the first atomic memory access can be coalesced with the second atomic memory access based on a symmetric access to different memory modules. In these implementations, determining whether the first atomic memory access can be coalesced with the second atomic memory access based on a symmetric access to different memory modules may include determining, in response to a triggering event, whether a first cache line that includes the first atomic memory access can be coalesced with a second cache line that includes the second atomic memory access, where the first cache line and the second cache line are in a special cache state. In some implementations, coalescing the first atomic memory access and the second atomic memory access in the cache prior to requesting memory-local processing by the memory-local compute unit may include coalescing the first atomic memory access and the second atomic memory access using a multi-module memory-local processing command.

Yet another embodiment is directed to a system for dynamically coalescing atomic memory operations for memory-local computing. The system includes a memory device including at least one memory-local compute unit. The system also includes a computing device configured to determine whether a first atomic memory access and a second atomic memory access are candidates for coalescing and coalesce the first atomic memory access and the second atomic memory access in a cache prior to requesting memory-local processing by a memory-local compute unit.

In some implementations, the computing device is further configured to determine that the first atomic memory access is a candidate for coalescing, allocate a cache line in a special state without loading data from memory, and store an operand of the first atomic memory access in the cache line at a location targeted by the first atomic memory access. In these implementations, determining whether a first atomic memory access and a second atomic memory access are candidates for coalescing includes determining that the second atomic memory access is a candidate for coalescing with the first atomic memory access. In these implementations, coalescing the first atomic memory access and the second atomic memory access in the cache prior to requesting memory-local processing by the memory-local compute unit includes coalescing the first atomic memory access and the second atomic memory access by performing the operation of the second atomic memory access, using an operand of the second atomic memory access, on data at a location in the cache line targeted by the second atomic memory access.

In some implementations, determining whether a first atomic memory access and a second atomic memory access are candidates for coalescing includes determining whether the first atomic memory access can be coalesced with the second atomic memory access based on a symmetric access to different memory modules. In these implementations, coalescing the first atomic memory access and the second atomic memory access in the cache prior to requesting memory-local processing by the memory-local compute unit includes coalescing the first atomic memory access and the second atomic memory access using a multi-module memory-local processing command.

Embodiments in accordance with the present disclosure will be described in further detail beginning with FIG. 1. Like reference numerals refer to like elements throughout the specification and drawings. FIG. 1 sets forth a block diagram of an example system 100 for dynamically coalescing atomic memory operations for memory-local computing in accordance with some embodiments of the present disclosure. The example system 100 of FIG. 1 includes a host device 130 (e.g., a system-on-chip (SoC) device or system-in-package (SiP) device) that includes at least one host execution engine 102. Although not depicted, the host device 130 may include multiple host execution engines including multiple different types of host execution engines. In various examples, a host execution engine 102 may be a central processing unit (CPU), a graphics processing unit (GPU), an accelerated processing unit (APU), an application-specific processor, a configurable processor, or other such compute engine capable of supporting multiple concurrent sequences of computation. The host device 130 hosts one or more applications on the host execution engine 102. The hosted applications may be multithreaded applications, such that a host execution engine 102 may execute multiple concurrent threads of an application and/or multiple execution engines 102 may concurrently execute threads of the same application.

In the example of FIG. 1, the host execution engine is a GPU compute unit that includes multiple single instruction multiple data (SIMD) cores 104 having multiple processing elements 106, a register file 134, and a first level cache 136. A scheduler 108 loads instructions from an instruction pool and deploys them on the SIMD core 104 for execution. When a memory access to system memory 120 is required, the SIMD core 104 issues a memory access request to a cache hierarchy, a local data store, a global data store, or other transient storage component. For the purpose of this discussion, it assumed that each memory request passes through a cache 140 that is shared by multiple SIMD cores and may be shared by multiple host execution engines 102 (i.e., a lowest level cache). In some cases, the memory access request may be serviced by the cache, i.e., by cache control logic 142. In other cases, where the cache control logic 142 cannot service the memory access request in the cache 140, the cache control logic 142 issues a memory access request to a memory controller 112 for data targeted by the request. The memory controller 112, in turn, issues commands to the system memory 120 that cause the data stored at the memory location targeted by the request to be loaded from system memory 120 into a cache line 144 of the cache 140.

In the example of FIG. 1, the system memory 120 includes multiple modules such as DRAM banks 128. The set of memory modules that are connected to the memory controller 112 over an interconnect 180 represents a memory channel. Thus, FIG. 1 depicts one memory channel, although a memory channel may include multiple memory controllers. Further, the system memory 120 may include multiple memory channels. The system memory 120 includes or is coupled to one or more memory-local compute units. A memory-local compute unit includes registers, an ALU or simple compute core, and control logic for carrying out simple arithmetic operations on data stored in the system memory 120. In some examples, the memory-local compute unit may be a near-memory compute unit that is coupled to a memory device (e.g., memory die or chip). For example, a near-memory compute unit may be implemented in a logic die of a 3D stacked memory, in a memory accelerator coupled to a memory device, or on an interposer between the host device 130 and the system memory 120. In other examples, the memory-local compute unit may be a processing-in-memory (PIM) unit that is implemented in the memory die or, particularly, within a DRAM bank (i.e., a bank-local PIM unit). For purposes of illustration and not limitation, the system memory 120 in FIG. 1 includes multiple bank-local PIM units 126 that are memory-local compute units.

The cache 140 further includes a cache compute logic 146 that can perform atomic operations on data in the cache. For example, when an atomic memory access request (i.e., a memory access request that includes an atomic operation) is received at the cache, the data targeted by an atomic memory access request may already be stored in the cache 140. In this example, the cache compute logic 146 performs the atomic operation (e.g., a read-modify-write (RMW) operation) of the atomic memory access request using the operand supplied in the request and the data in the cache corresponding to the location (e.g., memory address) targeted by the request. If the data targeted by the atomic memory access request is not already stored in the cache, the cache control logic 142 allocates a cache line 144 and loads data from system memory that includes the data targeted by the atomic RMW access request. The cache compute logic 146 performs the atomic operation using the loaded data and the operand supplied by the request and stores the result to the allocated cache line. In either case, when a writeback of the dirty data is triggered (e.g., when the cache line is evicted), the updated cache line is written to system memory 120.

When an atomic memory access request misses the cache 140, the cache control logic 142 may reduce data transfer by issuing a request for the atomic operation to be performed at the memory-local compute unit (i.e., the PIM unit 126), rather than loading the data into the cache 140 for execution in the host device 130. However, while this technique exploits the benefits of memory-local computing and PIM, it ignores cache locality and reuse because the targeted data is never loaded into the cache 140. Thus, multiple hits to the same cache line will continue to trigger the same number of PIM requests.

To balance these techniques, a special cache state is utilized to allow atomic memory accesses to coalesce in a cache line before sending the atomic memory accesses to the memory-local compute unit for execution. This atomic coalescing (AC) state may be used to delay atomic operations in the cache that can be performed by the PIM unit 126 and coalesce them with subsequent atomics of the same type to the same cache line. Use of the AC state requires that the atomic operations involved are commutative and associative (e.g., add, multiply, MAX, MIN) and do not return a data value. However, some non-commutative operations may be converted to commutative at the cache (e.g., atomic subtract may be converted to atomic add by negating the operand). When the cache control logic 142 allocates the cache line in the AC state, the cache line is not populated with data loaded from system memory. Rather, the operand of the atomic memory access request is stored in the cache line. A subsequent atomic memory access of the same type that does not return a data value will be allowed to hit the cache line, and the corresponding operand will be stored in the cache line at the targeted location. A standard read or write operation, or an atomic operation that returns a data value, will not be allowed to hit the cache. In this case, the case miss will trigger a load of data into the cache line from memory, the pending atomic operation will be performed on the loaded data, and the result will be written to the cache line and marked dirty valid. Assuming that no such non-coalescing memory access request is received, the atomic operations will continue to coalesce in the cache line until a writeback of the data is triggered, at which time the cache control logic 142 will issue PIM commands for the atomic operations represented in the cache line.

In some examples, there may be different AC states for different types of atomic operations. For example, there may be one AC state for atomic add and another AC state for atomic multiply, although only one type of atomic may be stored per cache line. In other examples, the AC state may be tracked at a coarser granularity such as a cache bank. For example, a given cache bank may only allow one type of atomic to be used for AC state at any time. In still further examples, the AC state tracked by the cache controller may be hardwired or set in advance by software based on expected use cases. For example, a system may only support coalescing for atomic RMW accesses that use an atomic add operation.

The cache control logic 142 may also exploit the parallelism of access to multiple DRAM modules by issuing multi-module PIM commands that coalesce PIM operations. For a bank-local PIM implementation, a multicast PIM command performs the same operation on the same column index in all target DRAM banks from the row buffer. In one example, the cache control logic 142 uses the AC states of cache lines to identify cache lines that may be coalesced by combining PIM requests into multicast PIM commands to multiple DRAM banks.

Figure 2:
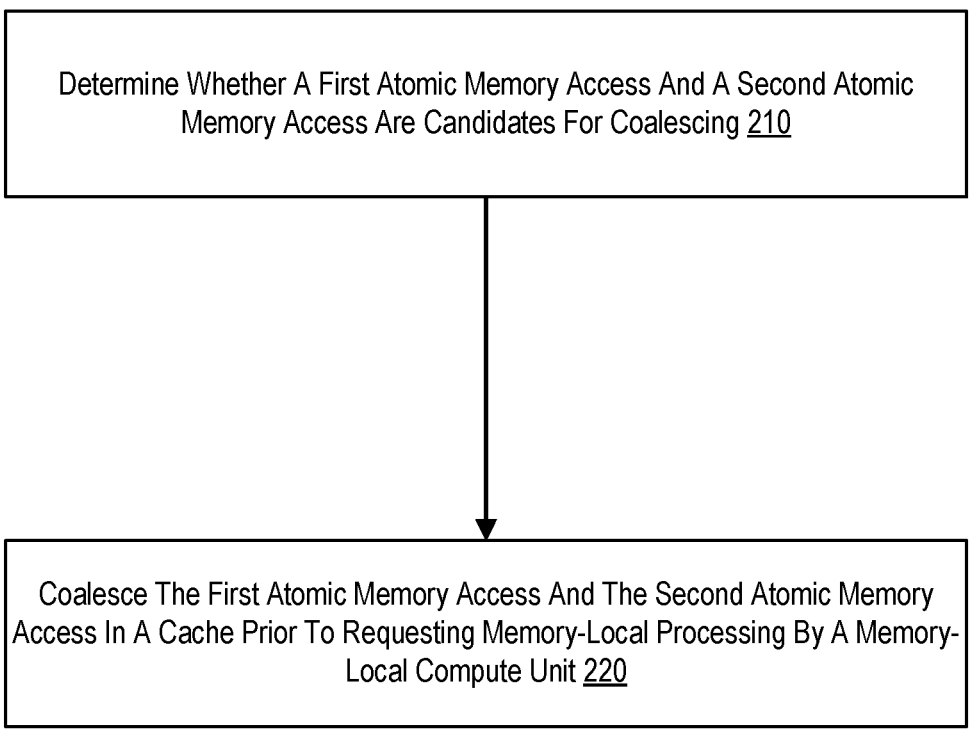
FIG. 2 sets forth a flow chart illustrating an example method of dynamically coalescing atomic memory operations for memory-local computing in accordance with some embodiments of the present disclosure.

For further explanation, FIG. 2 sets forth a flow chart illustrating an example method of dynamically coalescing atomic memory operations for memory-local computing in accordance with some embodiments of the present disclosure. The method includes determining 210 whether a first atomic memory access and a second atomic memory access are candidates for coalescing. In some examples, determining 210 whether a first atomic memory access and a second atomic memory access are candidates for coalescing is carried out by cache control logic (e.g., the cache control logic 142 of FIG. 1) determining whether the two or more atomic memory accesses such as atomic read-modify write (RMW) accesses could be coalesced by sending near-memory processing commands for those two or more atomic RMW accesses together based on the same triggering event. For example, the triggering event may be writeback, a cache line eviction, or a cache line insertion that affects at least one of the two or more RMW accesses. In one example, two atomic RMW accesses that hit the same cache line may be candidates for coalescing if they use the same type of modify operation. In another example, two atomic RMW accesses may be candidates for coalescing if they target the memory location of different memory modules.

In some examples, determining 210 whether a first atomic memory access and a second atomic memory access are candidates for coalescing may include determining whether two atomic RMW access are candidates for cache line coalescing. In these examples, determining whether two atomic RMW access are candidates for cache line coalescing may include determining whether the two atomic RMW accesses target the same cache line, determining whether the two atomic RMW accesses use the same atomic operation, determining whether those operations are communitive and associative, and determining whether the operations require a return value. In such examples, when two atomic RMW accesses hit the same cache line, use the same type of atomic operation (e.g., both operations are addition operations, both operations are multiplication operations, etc.) that are communitive and associative operations, and when neither access requires a return value, then the two atomic RMW accesses are candidates for cache line coalescing, as will be explained in more detail below.

In some examples, determining 210 whether a first atomic memory access and a second atomic memory access are candidates for coalescing may include determining whether the two atomic RMW access are candidates for multi-module coalescing. In these examples, determining whether the two atomic RMW access are candidates for multi-module coalescing may include determining whether two atomic RMW accesses that are placed in different cache lines use the same type of near-memory compute operations and whether the accesses are to different banks of the same channel with the same column offset in the DRAM row. In such examples, when two atomic RMW accesses are placed in different cache lines and use the same type of near-memory compute operation(s), and when those atomic RMW access target different banks of the same channel using the same column offset in the DRAM row, the two atomic RMW accesses are candidates for multi-module coalescing, as will be explained in more detail below.

Figure 3:
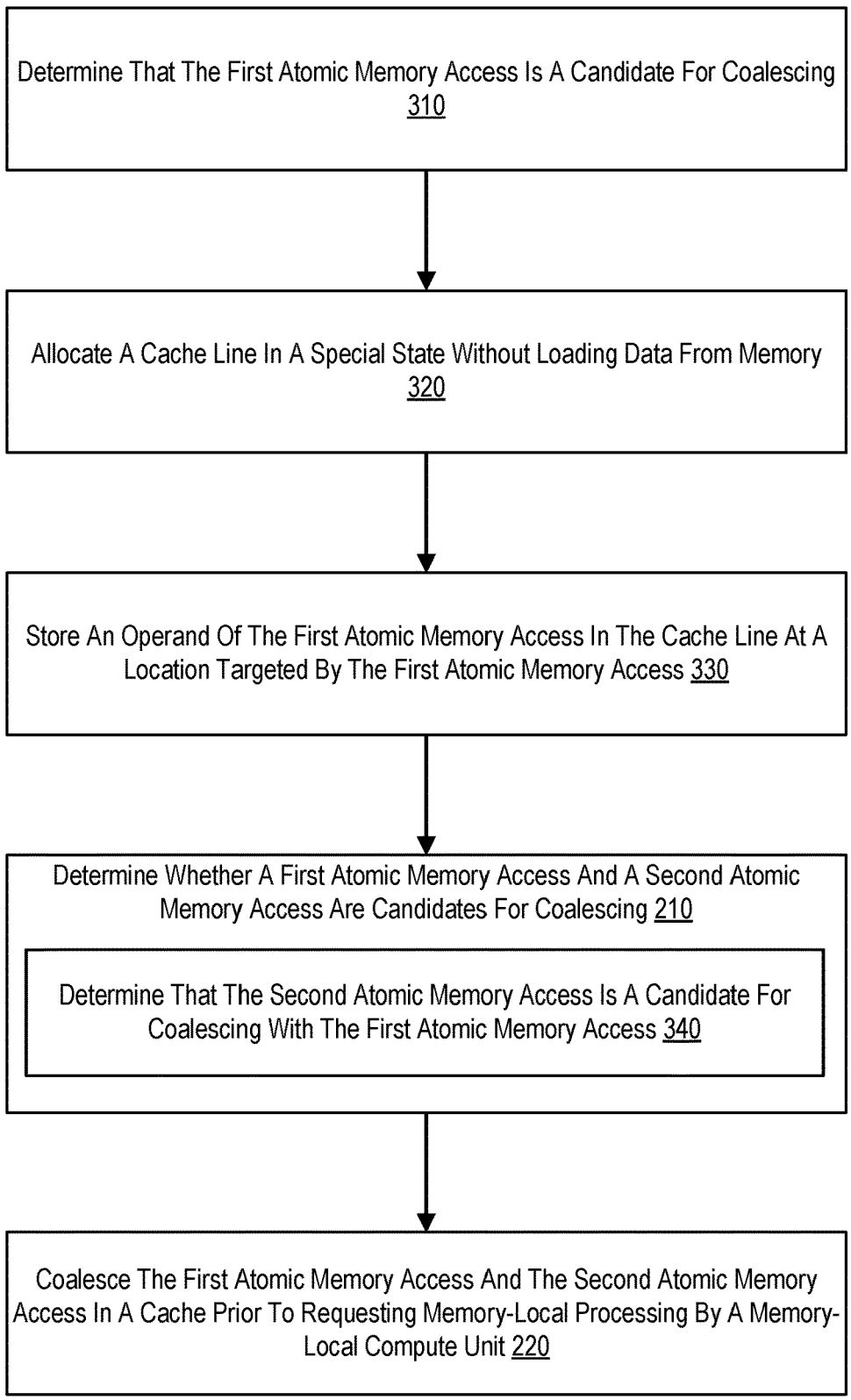
FIG. 3 sets forth a flow chart illustrating an example method of dynamically coalescing atomic memory operations for memory-local computing in accordance with some embodiments of the present disclosure.

For further explanation, FIG. 3 sets forth a flow chart illustrating an example method of dynamically coalescing atomic memory operations for memory-local computing in accordance with some embodiments of the present disclosure. Like the example method of FIG. 2, the example method of FIG. 3 also includes determining 210 whether a first atomic memory access and a second atomic memory access are candidates for coalescing; and coalescing 220 the first atomic memory access and the second atomic memory access in a cache prior to requesting memory-local processing by a memory-local compute unit.

As previously mentioned, coalescing in accordance with some embodiments includes cache line coalescing. To facilitate cache line coalescing, the example method of FIG. 3 also includes determining 310 that the first atomic memory access is a candidate for coalescing. In some examples, determining 310 that the first atomic memory access is a candidate for coalescing is carried out by a cache controller (e.g., the cache control logic 142) receiving or identifying a memory request for a first atomic RMW access, for example, from a host compute unit (e.g., the host compute engine 102 of FIG. 1). In these examples, determining 310 that the first atomic memory access is a candidate for coalescing also includes determining that the first atomic RMW access uses a communitive and associative operation that could be performed at a near-memory compute unit. In some examples, determining 310 that the first atomic memory access is a candidate for coalescing further includes determining that the memory location targeted by the request for the first atomic RMW request hits an invalid cache line or misses the cache.

The example method of FIG. 3 also includes allocating 320 a cache line in a special state without loading data from memory. In some examples, allocating 320 a cache line in a special state without loading data from memory is carried out by the cache controller allocating the cache line in the atomic coalescing (AC) state described above. Moreover, the cache line is allocated in the AC state without populating the cache line with data loaded from system memory. In some examples, there may be different AC states for different types of atomic operations. For example, there may be one AC state for atomic add and another AC state for atomic multiply, although only one type of atomic may be stored per cache line. In other examples, the AC state may be tracked at a coarser granularity such as a cache bank. For example, a given cache bank may only allow one type of atomic to be used for AC state at any time. In still further examples, the AC state tracked by the cache controller may be hardwired based on support restrictions. For example, a system may only support coalescing for atomic RMW accesses that use an atomic add operation.

When a cache line is in the AC state, another request for an atomic RMW access that is a candidate for coalescing with the first atomic RMW will result in a cache hit. Whereas another request that is not a candidate for coalescing with the first atomic RMW access will result in a cache miss. For example, another memory request such as a request for a read memory access, write memory access, a memory access that includes non-communitive or non-associative atomic operation, or a memory access that includes an atomic operation with a return value will result in a cache miss. Furthermore, the receipt of another memory request that is not a candidate for coalescing will trigger a load of data from system memory into the cache line, and the AC state will be transitioned to a dirty valid state.

The example method of FIG. 3 also includes storing 330 an operand of the first atomic memory access in the cache line at a location targeted by the first atomic memory access. In some examples, storing 330 an operand of the first atomic memory access in the cache line at a location targeted by the first atomic memory access is carried out by the cache controller storing the operand included in the request for the first atomic RMW access in the cache line at the location (e.g., offset or address) targeted by the access. In these examples, storing 330 an operand of the first atomic memory access in the cache line at a location targeted by the first atomic memory access may also include storing NULL values (e.g., '0' for atomics add/subtract, '1' for atomic multiply, MAX INT for atomic MIN, etc.) in the rest of the cache line. Consider an example of an atomic RMW access that is an atomic add operation targeting an address corresponding to offset location M in a cache line with an operand value of N. When the atomic RMW access request hits an invalid cache line, a cache line is allocated in an AC state for atomic add operations. The operand value N of the atomic add operation (from the atomic RMW access request) is stored at offset location M in the cache line. All other offsets in the cache line are set to '0.' For any subsequent atomic RMW access request that hits the cache line in the AC state and is candidate for coalescing, the atomic operation of that atomic RMW access is performed in place using the operand from the subsequent request and the operand value N (if the subsequent request targets offset location M of the pending atomic) or operand value '0' (if the subsequent request target any other location in the cache line).

In the example method of FIG. 3, determining 210 whether a first atomic memory access and a second atomic memory access are candidates for coalescing includes determining 340 that the second atomic memory access is a candidate for coalescing with the first atomic memory access. In some examples, determining 340 that the second atomic memory access is a candidate for coalescing with the first atomic memory access is carried out by the cache controller determining that a request for a second atomic RMW access hits the cache line in the AC state and inspecting the properties of the second atomic RMW access. If the second RMW access is the same type of atomic operation as the first RMW access and that operation is communitive and associative (e.g., atomic add), and the second RMW access does not require a return value, the second RMW access may be determined to be a candidate for coalescing with the first atomic RMW access.

Figure 4:
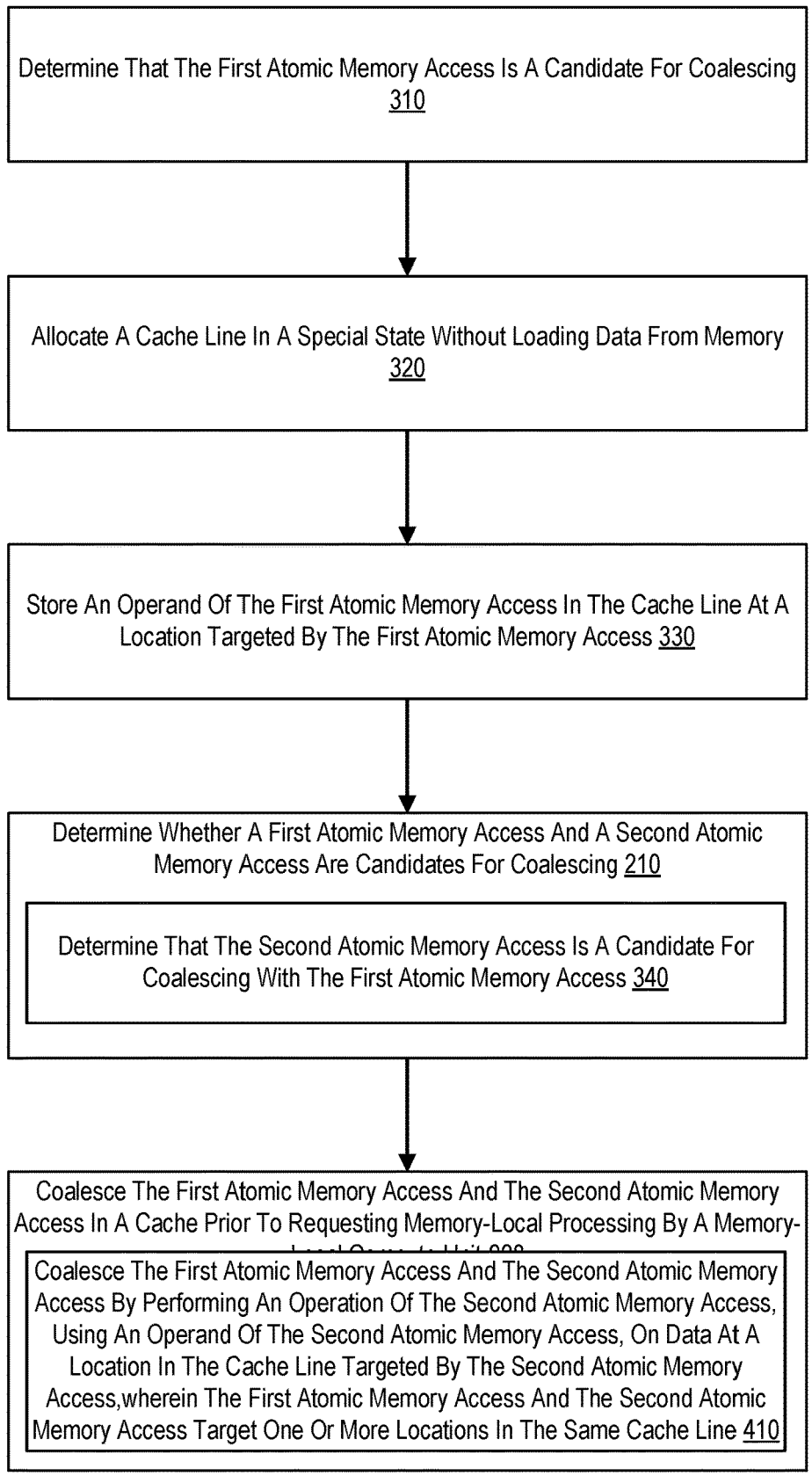
FIG. 4 sets forth a flow chart illustrating an example method of dynamically coalescing atomic memory operations for memory-local computing in accordance with some embodiments of the present disclosure.

For further explanation, FIG. 4 sets forth a flow chart illustrating an example method of dynamically coalescing atomic memory operations for memory-local computing in accordance with some embodiments of the present disclosure. Like the example method of FIG. 3, the example method of FIG. 4 also includes determining 310 that the first atomic memory access is a candidate for coalescing; allocating 320 a cache line in a special state without loading data from memory; storing 330 an operand of the first atomic memory access in the cache line at a location targeted by the first atomic memory access; determining 210 whether a first atomic memory access and a second atomic memory access are candidates for coalescing including determining 340 that the second atomic memory access is a candidate for coalescing with the first atomic memory access; and coalescing 220 the first atomic memory access and the second atomic memory access in a cache prior to requesting memory-local processing by a memory-local compute unit.

In the example method of FIG. 4, coalescing 220 the first atomic memory access and the second atomic memory access in a cache prior to requesting memory-local processing by a memory-local compute unit includes coalescing 410 the first atomic memory access and the second atomic memory access by performing an operation of the second atomic memory access, using an operand of the second atomic memory access, on data at a location in the cache line targeted by the second atomic memory access, wherein the first atomic memory access and the second atomic memory access target one or more locations in the same cache line. In some examples, coalescing 410 the first atomic memory access and the second atomic memory access by performing an operation of the second atomic memory access, using an operand of the second atomic memory access, on data at a location in the cache line targeted by the second atomic memory access is carried out by the cache controller delaying the sending one or more near-memory processing commands (e.g., PIM commands), corresponding to the first RMW access, to the memory controller. That is, subsequent RMW accesses (e.g., the second atomic RMW access) that are candidates for coalescing are allowed to coalesce by performing those atomic operations in the cache line until a triggering event occurs. The modify operation (e.g., atomicAdd, atomicMultiply) of the second or subsequent RMW access is performed, using the operand of the second RMW access, on the data in the cache line that include operand(s) of the first RMW access or prior RMW accesses.

For example, if a first RMW access includes an atomicAdd operation targeting a particular cache line offset, and the operand of the first RMW access is '5', then '5' is stored at the particular cache line offset (assuming that the initial value is NULL). When a second RMW access having an operand of '3' targets the same cache line offset as the first RMW access and the second RMW access also includes an atomicAdd operation, then the atomicAdd operation of the second RMW access (using the operand '3') is performed on the data (the operand '5' of the first RMW access) stored at that offset. The resulting value of the operation (that is, '8') is stored at the same offset targeted by the first RMW access. However, if the second RMW access targets the same cache line as the first RMW access but at a different second location (i.e., a different offset), and the value of that location is NULL from the original cache line allocation, then the operand of the second RMW access is stored at the second location. Thus, RMW access are coalesced in the cache line either by storing their operands in the cache line if the value at the targeted location is NULL, or by performing the corresponding operation in the cache line when they target the same location (i.e., offset) in the cache line.

In some examples, coalescing is carried out by a cache compute unit (e.g., the cache compute logic of FIG. 1) performing the atomic operation in place based on the operand of the subsequent atomic RMW access and the data stored at the target location in the cache line. For example, the data in the cache line at the target location may be a NULL value initialized during the allocation of the cache line in the AC state. The data in the cache line at the target location may operand value from a prior pending atomic RMW access. The data in the cache line at the target location may be a computed result of two or more prior pending atomic RMW accesses. In some examples, the triggering event that terminates the coalescing may be a writeback (e.g., due to an eviction of the cache line in the AC state), at which time the coalesced atomic RMW accesses are issued for execution by the memory-local compute unit. In other examples, the triggering event that terminates the coalescing may be a memory access that is not a candidate for coalescing and that targets a location in the cache line. In these examples, the memory access misses the cache causing data to be loaded from system memory into the cache line. In such an example, the pending atomic RMW access are performed on the loaded data, and the cache line containing the modified data is transitioned form the AC state to the dirty valid state.

Figure 5:
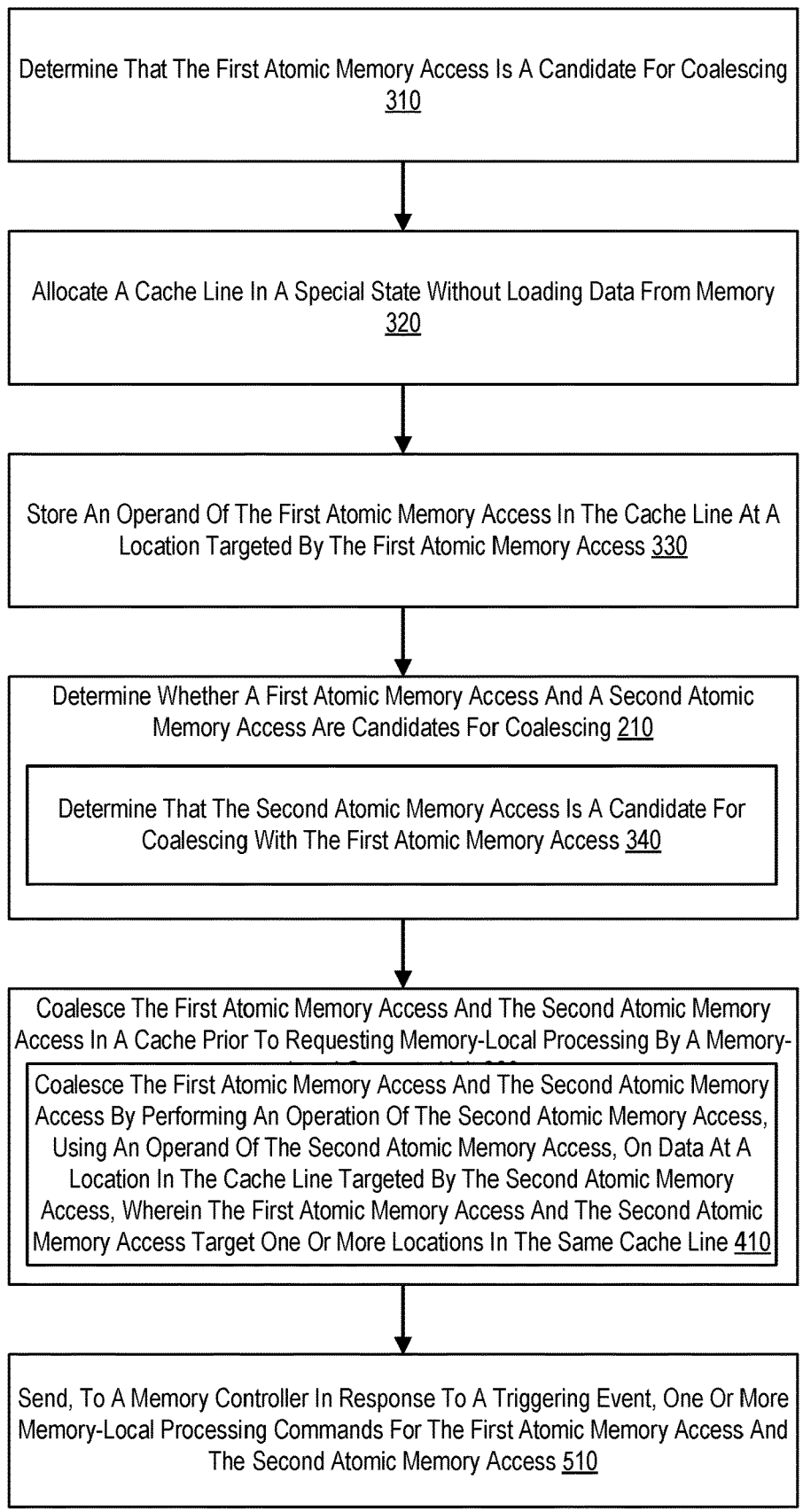
FIG. 5 sets forth a flow chart illustrating another example method of dynamically coalescing atomic memory operations for memory-local computing in accordance with some embodiments of the present disclosure.

For further explanation, FIG. 5 sets forth a flow chart illustrating an example method of dynamically coalescing atomic memory operations for memory-local computing in accordance with some embodiments of the present disclosure. Like the example method of FIG. 4, the example method of FIG. 5 also includes determining 310 that the first atomic memory access is a candidate for coalescing; allocating 320 a cache line in a special state without loading data from memory; storing 330 an operand of the first atomic memory access in the cache line at a location targeted by the first atomic memory access; determining 210 whether a first atomic memory access and a second atomic memory access are candidates for coalescing including determining 340 that the second atomic memory access is a candidate for coalescing with the first atomic memory access; and coalescing 220 the first atomic memory access and the second atomic memory access in a cache prior to requesting memory-local processing by a memory-local compute unit including coalescing 410 the first atomic memory access and the second atomic memory access by performing an operation of the second atomic memory access, using an operand of the second atomic memory access, on data at a location in the cache line targeted by the second atomic memory access, wherein the first atomic memory access and the second atomic memory access target one or more locations in the same cache line.

The example method of FIG. 5 also includes sending 510, to a memory controller in response to a triggering event, one or more memory-local processing commands for the first atomic memory access and the second atomic memory access. In some examples, sending 510, to a memory controller in response to a triggering event, one or more memory-local processing commands for the first atomic memory access and the second atomic memory access is carried out by the cache controller generating memory-local processing commands (e.g., PIM commands) for each atomic RMW access that has been coalesced in the cache line in the AC state. In some cases (e.g., where the host compute unit is a GPU), the stream of memory-local processing commands corresponding to each atomic RMW access may be transmitted using a single instruction over multiple SIMD data lanes. Memory-local compute operations will likely be at coarser granularity than individual atomic accesses (although still potentially at a finer granularity than a full cache line). If a memory-local processing command is used for a single atomic, this may be wasteful since all SIMD lanes except one need to be disabled. However, if multiple atomics accesses fall in the same memory-local processing chunk, the PIM SIMD operation can perform them all with a single operation. For example, a single load+Add' memory-local processing command may be used for all of the coalesced atomic RMW accesses in the cache line, while the operands that target different memory locations may be provided independently through multiple SIMD data lanes. Even if atomic RMW accesses to the same cache line address fall in different memory-local processing chunks, they still enjoy the benefit of improved row locality. That is, without coalescing, a DRAM row activation may need to be performed twice before performing each memory-local compute operation. With coalescing, multiple PIM commands may be required, but the DRAM row once only needs to be activated once. In some examples, the triggering event may be a cache line writeback (e.g., due to an eviction of the cache line).

Figure 6:
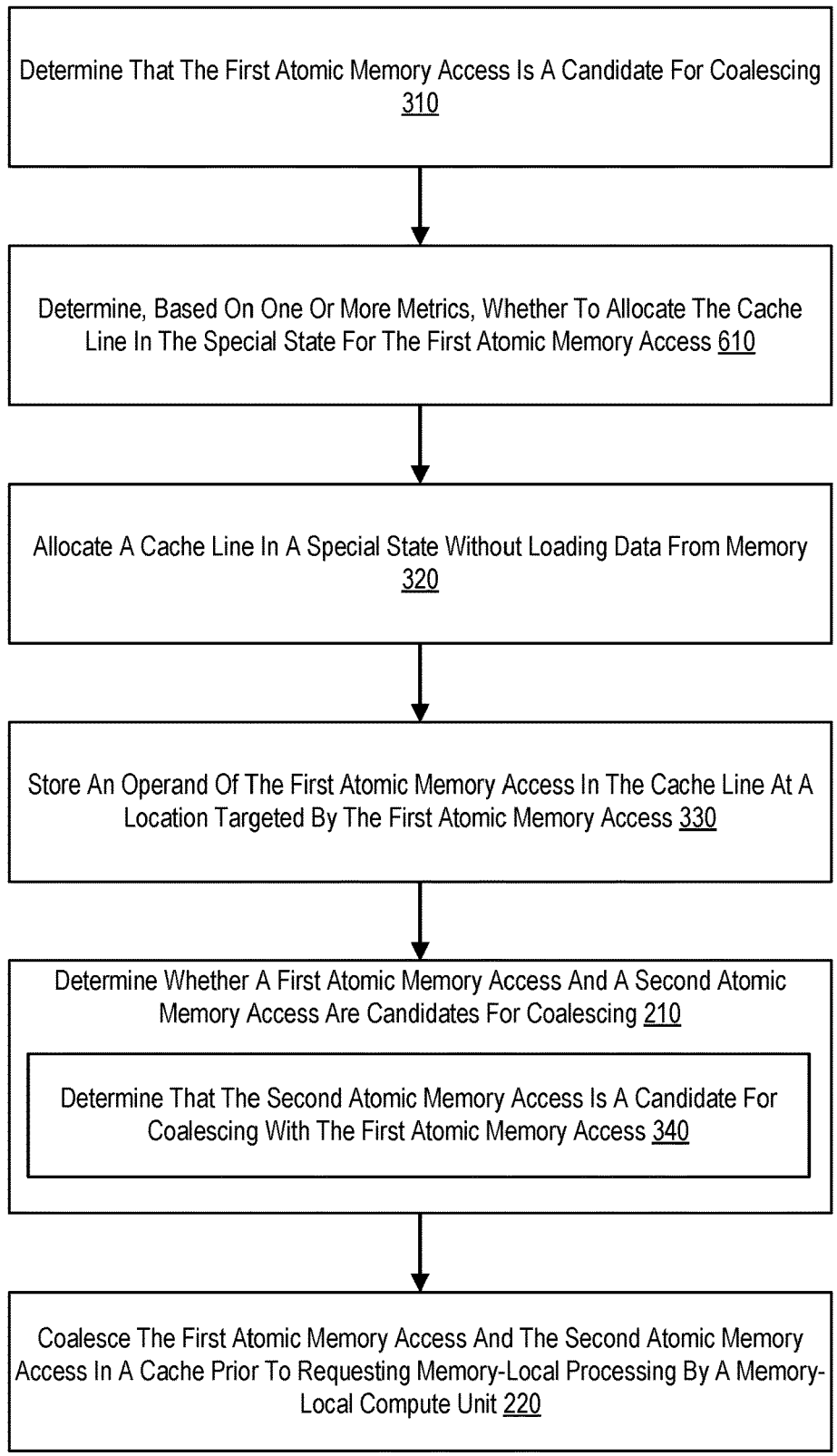
FIG. 6 sets forth a flow chart illustrating another example method of dynamically coalescing atomic memory operations for memory-local computing in accordance with some embodiments of the present disclosure.

For further explanation, FIG. 6 sets forth a flow chart illustrating an example method of dynamically coalescing atomic memory operations for memory-local computing in accordance with some embodiments of the present disclosure. Like the example method of FIG. 3, the example method of FIG. 6 also includes determining 310 that the first atomic memory access is a candidate for coalescing; allocating 320 a cache line in a special state without loading data from memory; storing 330 an operand of the first atomic memory access in the cache line at a location targeted by the first atomic memory access; determining 210 whether a first atomic memory access and a second atomic memory access are candidates for coalescing including determining 340 that the second atomic memory access is a candidate for coalescing with the first atomic memory access; and coalescing 220 the first atomic memory access and the second atomic memory access in a cache prior to requesting memory-local processing by a memory-local compute unit.

The example method of FIG. 6 also includes determining 610, based on one or more metrics, whether to allocate the cache line in the special state for the first atomic memory access. In some examples, determining 610, based on one or more metrics, whether to allocate the cache line in the special state for the first atomic memory access is carried out by the cache controller tracking a set of metrics to determine when coalescing should be performed. While coalescing atomic RMW access that can be performed by memory-local compute units does not introduce any memory transfers relative to a memory-local compute implementation or a host-based compute implementations, it can move a memory transfer onto the critical path. That is, an atomic RMW access to an AC line that cannot be coalesced needs to trigger a memory load before returning, while it would have otherwise hit the cache in a host-based implementation. Therefore, it may be desirable to dynamically decide whether to use the AC state based on the likelihood of such a scenario. In particular, the cache controlled uses one or more metrics to assess the likelihood that there will be a non-coalesce-able access to a line in AC state before the AC line is applied to memory.

In some examples, this likelihood that an atomic RMW access will trigger a load of data from system memory can be approximated by tracking the proportion of recent accesses that could not be coalesce and that target lines in AC state. For example, if few cache lines are in the AC state, a dirty valid state can be used since this could indicate a recent atomic access. If this proportion is low, a transition to AC state is unlikely to hurt performance because non-coalesce-able accesses are unlikely to hit on an AC cache line.

In some examples, this likelihood that an atomic RMW access will trigger a load of data from system memory can be approximated by tracking what proportion of recent accesses are atomic accesses that can be coalesced. When an AC cache line allocation is possible, the proportion of corresponding atomic types is checked. If this is high, use of the AC state is less likely to hurt performance because it is more likely that future accesses may be coalesced.

In some examples, this likelihood that an atomic RMW access will trigger a load of data from system memory can be approximated based on additional information supplied by software (e.g., by writing to a memory-mapped register) about atomic access locality and the likelihood that atomic accesses can be coalesced.

Figure 7:
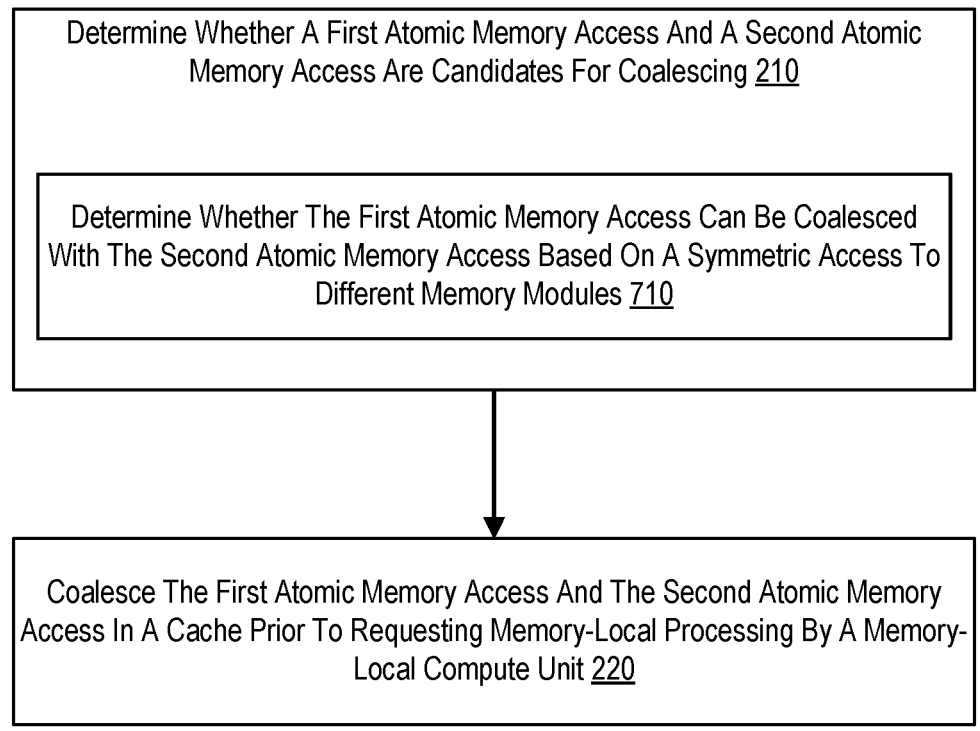
FIG. 7 sets forth a flow chart illustrating another example method of dynamically coalescing atomic memory operations for memory-local computing in accordance with some embodiments of the present disclosure.

For further explanation, FIG. 7 sets forth a flow chart illustrating an example method of dynamically coalescing atomic memory operations for memory-local computing in accordance with some embodiments of the present disclosure. Like the example method of FIG. 2, the example method of FIG. 7 also includes determining 210 whether a first atomic memory access and a second atomic memory access are candidates for coalescing; and coalescing 220 the first atomic memory access and the second atomic memory access in a cache prior to requesting memory-local processing by a memory-local compute unit.

In the example method of FIG. 7, determining 210 whether a first atomic memory access and a second atomic memory access are candidates for coalescing includes determining 710 whether the first atomic memory access can be coalesced with the second atomic memory access based on a symmetric access to different memory modules. In some examples, determining 710 whether the first atomic memory access can be coalesced with the second atomic memory access based on a symmetric access to different memory modules is carried out by the cache controller inspecting the properties of incoming atomic memory accesses and determining whether any of those atomic memory accesses use the same atomic operation and thus the same memory-local processing commands. For example, the cache controller determines whether a first atomic RMW access and a second atomic RMW access use the same atomic operation and thus the same memory-local processing commands.

In some examples, whether two RMW access are symmetric may be based on conditions required of a multicast command such as being of compatible atomic operator types (e.g., two adds) and/or targeting addresses that meet some condition (e.g., they target the same DRAM column in different DRAM banks in the same memory channel). Thus, in these examples, determining 710 whether the first atomic memory access can be coalesced with the second atomic memory access based on a symmetric access to different memory modules is also carried out by determining, for accesses that use the same atomic operation, whether those atomic RWM accesses symmetrical target memory locations in different memory modules. For example, the cache controller determines whether a memory location targeted by the first atomic RMW access and a memory location targeted by the second atomic RMW access are located in different banks of the same memory channel and share the same column offset in the DRAM row (i.e., the memory accesses are symmetrical between two modules). In such examples, these atomic RMW accesses are candidates for coalescing because the memory-local processing commands that perform the load or store from the memory regions may be implemented by a single multimodule command. That is, a single memory-local processing command that is multicast to multiple modules may be used to implement, for example, the 'store' command of both the first atomic RMW access and the second atomic RMW access because they target different banks in the same memory channel and share the same column offset in the DRAM row.

For further explanation, FIG. 8 sets forth a flow chart illustrating an example method of dynamically coalescing atomic memory operations for memory-local computing in accordance with some embodiments of the present disclosure. Like the example method of FIG. 7, the example method of FIG. 8 also includes determining 210 whether a first atomic memory access and a second atomic memory access are candidates for coalescing; and coalescing 220 the first atomic memory access and the second atomic memory access in a cache prior to requesting memory-local processing by a memory-local compute unit including determining 710 whether the first atomic memory access can be coalesced with the second atomic memory access based on a symmetric access to different memory modules.

In the example method of FIG. 8, determining 710 whether the first atomic memory access can be coalesced with the second atomic memory access based on a symmetric access to different memory modules includes determining 810, in response to a triggering event, whether a first cache line that includes the first atomic memory access can be coalesced with a second cache line that includes the second atomic memory access, wherein the first cache line and the second cache line are in a special cache state. In some examples, the AC cache state is leveraged to determine whether atomic RMW accesses are candidates for multi-module coalescing. In these examples, determining 710 whether a first cache line can be coalesced with a second cache line is carried out by the cache controller determining whether a first cache line in the AC state can be coalesced with a second cache line in the AC state. Where both cache lines share the same type of AC state, or it is otherwise provided that both cache lines include the same type of atomic operations, the atomic RMW accesses may be candidates for multi-module coalescing. In the case of a bank-local compute units such a PIM, two cache lines can be coalesced if they use the same type of memory-local compute operation and they are to different banks of the same channel and use the same column offset in the DRAM row. In other words, by leveraging the AC states of cache lines, atomic RMW accesses may be coalesced in the cache lines, and further coalesced by a multi-module, multicast memory-local processing command.

In some examples, the address bits that determine this placement in system memory indicate which cache indices may cache lines that can be potentially coalesced, and some or all of these may be searched when a memory-local processing command is about to be issued. For example, when the address bits used to determine DRAM column index and memory channel index completely overlap the address bits used to determine cache set index, then any cache lines that can be coalesced are guaranteed to fall in the same cache set. Thus, only that cache set needs to be inspected when the triggering event occurs.

In some examples, the triggering event may be a cache line eviction, such that when one cache line in the AC state is evicted, the cache controller searches the cache for other cache lines in the same AC state and determines whether those cache lines can be coalesced. Additionally or alternatively, in some examples, the triggering event may be the allocation of a new cache line in the AC state, for example, if it can be determined that there is some threshold number of atomic RMW accesses that can be coalesced (since the cache set is already being accessed).

Figure 9:
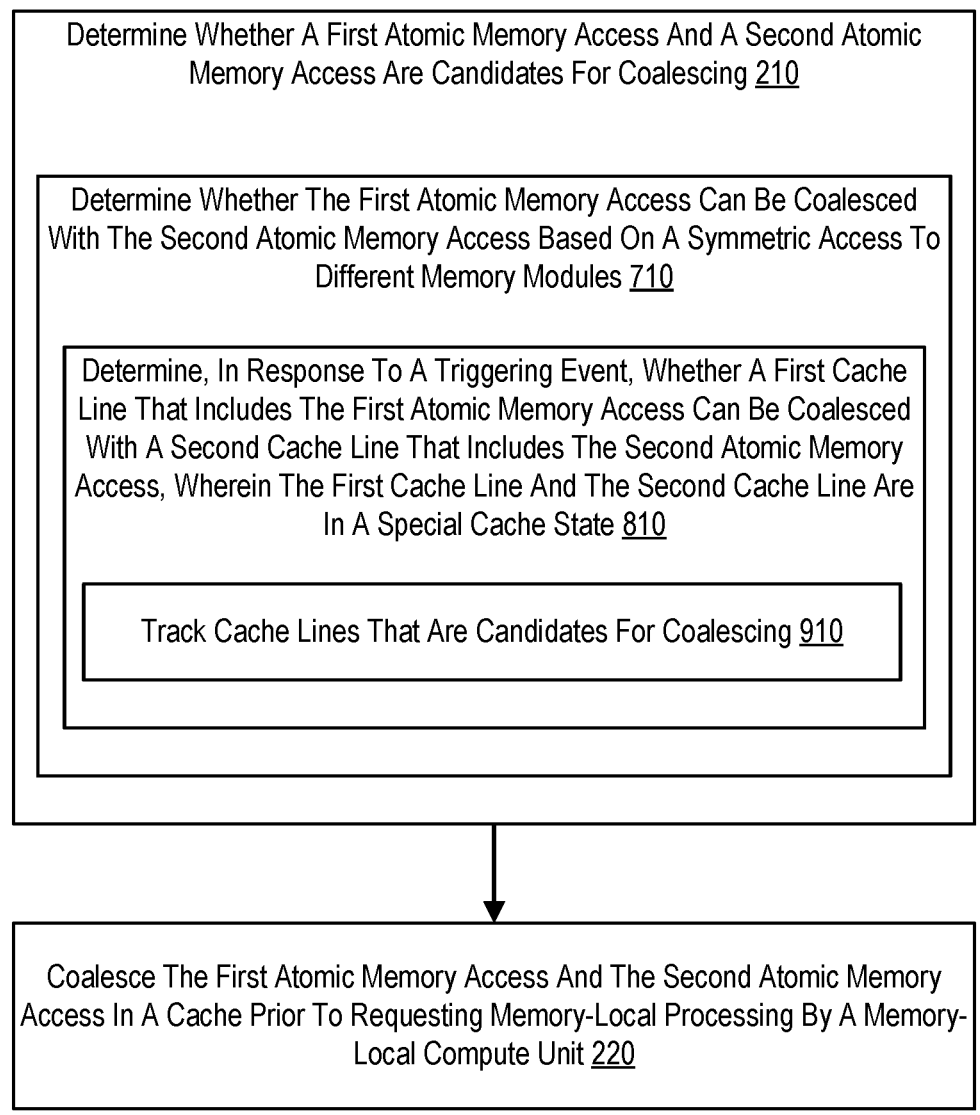
FIG. 9 sets forth a flow chart illustrating another example method of dynamically coalescing atomic memory operations for memory-local computing in accordance with some embodiments of the present disclosure.

For further explanation, FIG. 9 sets forth a flow chart illustrating an example method of dynamically coalescing atomic memory operations for memory-local computing in accordance with some embodiments of the present disclosure. Like the example method of FIG. 8, the example method of FIG. 9 also includes determining 210 whether a first atomic memory access and a second atomic memory access are candidates for coalescing; and coalescing 220 the first atomic memory access and the second atomic memory access in a cache prior to requesting memory-local processing by a memory-local compute unit including determining 710 whether the first atomic memory access can be coalesced with the second atomic memory access based on a symmetric access to different memory modules including determining 810 whether a first cache line can be coalesced with a second cache line.

In the example of FIG. 9, determining 810 whether a first cache line can be coalesced with a second cache line also includes tracking 910 cache lines that are candidates for coalescing. In some examples, tracking 910 cache lines that are candidates for coalescing is carried out by the cache controller maintain a structure for tracking cache lines in the AC state that have the potential for coalescing. In some implementations, each entry in the structure correspond to a single column index and channel combination. In such implementations, the structure may contain only the bits needed to look up the corresponding AC cache lines in the cache. For example, an entry could be inserted or updated whenever a cache line is allocated in the AC state in the cache, and removed or updated whenever an AC cache line is removed. Because multi-module coalescing is an optimization that does not impact functionality, and thus does not need to track every AC cache line in the cache, in some implementations a replacement policy is used that prioritizes recently accessed entries, frequently accessed entries, or entries that track more AC cache lines.

Figure 10:
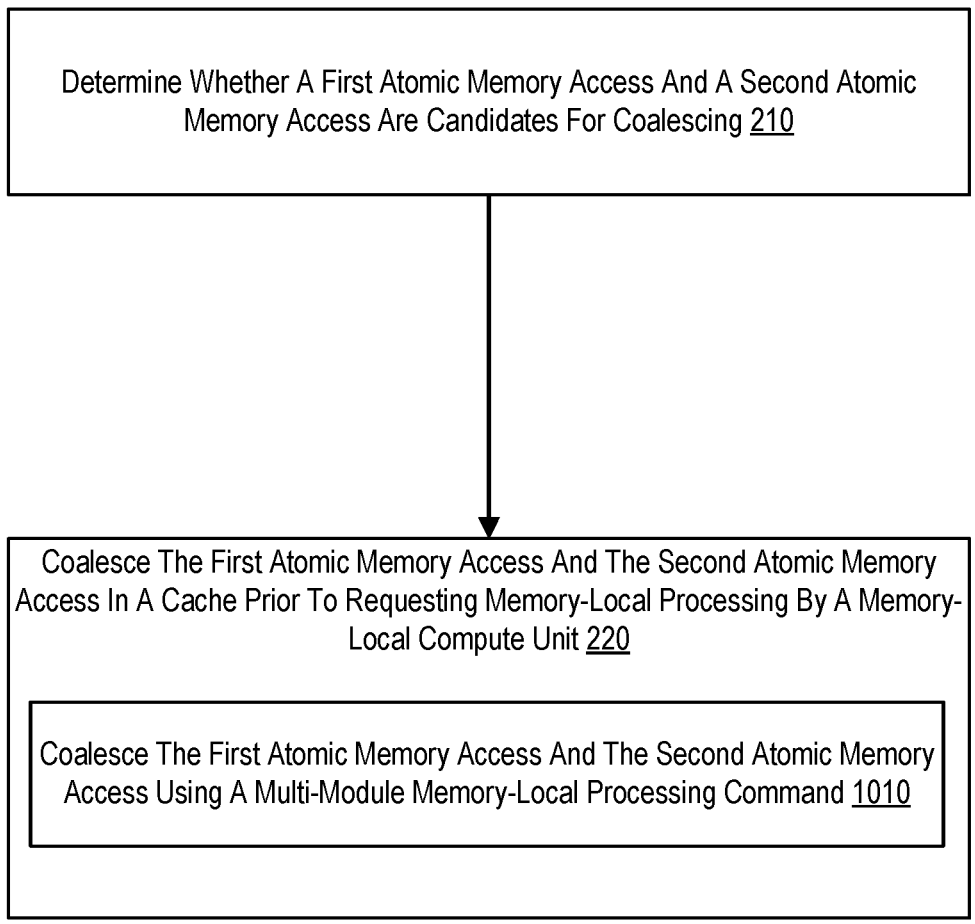
FIG. 10 sets forth a flow chart illustrating another example method of dynamically coalescing atomic memory operations for memory-local computing in accordance with some embodiments of the present disclosure.

For further explanation, FIG. 10 sets forth a flow chart illustrating an example method of dynamically coalescing atomic memory operations for memory-local computing in accordance with some embodiments of the present disclosure. Like the example method of FIG. 7, the example method of FIG. 10 also includes determining 210 whether a first atomic memory access and a second atomic memory access are candidates for coalescing; and coalescing 220 the first atomic memory access and the second atomic memory access in a cache prior to requesting memory-local processing by a memory-local compute unit including determining 710 whether the first atomic memory access can be coalesced with the second atomic memory access based on a symmetric access to different memory modules.

In the example method of FIG. 10, coalescing 220 the first atomic memory access and the second atomic memory access in a cache prior to requesting memory-local processing by a memory-local compute unit includes coalescing 1010 the first atomic memory access and the second atomic memory access using a multi-module memory-local processing command (e.g., a multicast PIM command). In some examples, coalescing 1010 the first atomic memory access and the second atomic memory access using a multi-module memory-local processing command is carried out by the cache controller generating a multicast memory-local processing command for at least one memory-local processing operation (e.g., PIM operation) that is common to both atomic memory accesses. For example, when two or more atomic memory accesses include the same memory-local processing operations (e.g., load, store, atomicAdd, atomic multiply, etc.), those memory-local processing operations may be coalesced in a single coalesced memory-local processing command that is multicast to multiple memory-local processing units. Consider an example PIM code segment for two atomic RMW accesses where bank-local PIM units are utilized. Each atomic RMW access may be broken down into a load+add' operation and a 'store' operation. In this example, assume one load+add operation stores the result of an addition of a first operand and data at memory location A in register1 of a first DRAM bank (e.g., 'PIM Ld+add R1←[a]+op1'), and another one load+add operation stores the result of an addition of a second operand and data at memory location B in register1 of a second DRAM bank (e.g., 'PIM Ld+add R1←[b]+op2'). The result from register1 in the first DRAM bank is then stored at memory location A in the first DRAM bank (e.g., 'PIM St R1→[a]') and the result from register1 in the second DRAM bank is then stored at memory location B (e.g., 'PIM St R1→[b]'). Thus, the code segment uses four command slots and two data slots (for the operands). The two load+add' operations cannot be coalesced, as each element requires a different operand to be transmitted across the data bus. However, assuming that memory location A and memory location B are in the same memory channel and use the same column offset in the DRAM row, the 'store' operations can be coalesced into a multi-module command received by the PIM unit in the first DRAM bank and the PIM unit in the second DRAM bank (e.g., 'PIM St→[a|b]'). The coalesced PIM command occupies one command slot, and thus reduces the number of command slots needed to effect the same number of store operations. Further optimizations to the PIM architecture may make these coalesced operations more efficient, or enable coalescing more flexible coalescing (e.g., A and B do not need to be to the same column).

Coalescing into multicast operations can also be valuable for multicast operations that do not require using different operands for each element. For example, some graph algorithms store the same value to a sparse set of neighbor nodes, rather than performing a RMW (e.g., breadth first search, graph coloring). Such an operation can exploit the multi-module operation enabled by bank-local compute units (i.e., bank-local PIM units) to improve memory bandwidth. To dynamically coalesce these operations, it is only necessary to track the type of command along with information identifying the affected lines, then apply the same command in parallel for any coalesced targets via memory-local processing command multicast. Although each memory module may require a different mask, these can be pre-stored near the memory-local compute unit).

Furthermore, the likelihood of multi-module coalescing can also be used to inform how atomic operations are handled by extending the decision methodology described for cache line coalescing above. When an atomic operation misses in the cache, the cache can use the metrics information to approximate whether multi-module coalescing is likely, and thus whether allocating an AC cache line is likely to be beneficial. For example, the cache controller may examine the cache for other AC cache lines that could be coalesced with an incoming atomic operation. If such cache lines exist, then the potential for multi-module coalescing potential is present. In another example, the cache controller may track the average number of lines that have been coalesced for recent dynamically coalesced memory-local processing operations. If this is high, then the potential for multi-module coalescing is higher.

Similarly, if the cache controller determines that an AC cache line should not be used for an atomic miss based on any of the above conditions, then it must decide whether to perform the atomic operation at the memory-local compute unit or in the cache. If there are multiple AC cache lines in the cache that can be coalesced with the incoming request and locality and reuse for atomics is expected to be rare, then offloading the operation to the memory-local compute unit is likely to be more beneficial. If there are no AC cache lines in the cache that can be coalesced and atomic locality/reuse is expected to be likely, then allocating a cache line and performing the atomic operation in the cache is preferred. These conditions may be calculated in multiple ways, including via simple counters for tracking relevant cache event frequency and/or occupancy.

In view of the foregoing, readers of skill in the art will appreciate that embodiments in accordance with the present disclosure offer a number of advantages. Embodiments may dynamically exploit cache locality when it is available before sending operations for memory-local processing (e.g., by a PIM unit). These embodiments offer a wider coalescing window and operations can be delayed indefinitely in the cache, providing more coalescing opportunities. Furthermore, due to the static and deterministic indexing of a cache based on a target address (in contrast with a queue in a memory controller), embodiments make it easier to track coalesce-able operations based on target address, which lends itself to a simpler and more efficient tracking mechanism for using multi-module, multicast memory-local processing commands. Moreover, the hardware and cache logic overhead introduced by the embodiments is minimal.

Embodiments allow memory-local computing to be used efficiently for atomic operations, which can improve performance for a range of important workloads (e.g., graph analytics, sparse matrix algebra, machine learning, etc.). Such applications may take advantage of cache locality when available, and dynamically identify coalescing opportunities to enable more efficient multi-module memory-local processing operations.

Embodiments can be a system, an apparatus, a method, and/or logic circuitry. Computer readable program instructions in the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions.

Aspects of the present disclosure are described herein with reference to flowchart illustrations and/or block diagrams of methods, apparatus (systems), and logic circuitry according to some embodiments of the disclosure. It will be understood that each block of the flowchart illustrations and/or block diagrams, and combinations of blocks in the flowchart illustrations and/or block diagrams, can be implemented by logic circuitry.

The logic circuitry may be implemented in a processor, other programmable data processing apparatus, or other device to cause a series of operational steps to be performed on the processor, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and logic circuitry according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While the present disclosure has been particularly shown and described with reference to embodiments thereof, it will be understood that various changes in form and details may be made therein without departing from the spirit and scope of the following claims. Therefore, the embodiments described herein should be considered in a descriptive sense only and not for purposes of limitation. The present disclosure is defined not by the detailed description but by the appended claims, and all differences within the scope will be construed as being included in the present disclosure.

What is claimed is:

1. A method of dynamically coalescing atomic memory operations for memory-local computing comprising:
   determining whether a first atomic memory access and a second atomic memory access are candidates for coalescing; and
   coalescing the first atomic memory access and the second atomic memory access in a cache line allocated in an atomic coalescing state prior to requesting memory-local processing by a memory-local compute unit.

2. The method of claim 1 further comprising:
   determining that the first atomic memory access is a candidate for coalescing;
   allocating a cache line in the atomic coalescing state without loading data from memory; and
   storing an operand of the first atomic memory access in the cache line at a location targeted by the first atomic memory access; and
   wherein determining whether the first atomic memory access and the second atomic memory access are candidates for coalescing includes:
   determining that the second atomic memory access is a candidate for coalescing with the first atomic memory access based on the operand of the first atomic memory access and an operand of the second atomic memory access.

3. The method of claim 2, wherein coalescing the first atomic memory access and the second atomic memory access in the cache line prior to requesting memory-local processing by a memory-local compute unit includes:
   coalescing the first atomic memory access and the second atomic memory access by performing an operation of the second atomic memory access, using the operand of the second atomic memory access, on data at a location in the cache line targeted by the second atomic memory access.

4. The method of claim 3 further comprising sending, to a memory controller in response to a triggering event, one or more memory-local processing commands for the first atomic memory access and the second atomic memory access.

5. The method of claim 2 further comprising determining, based on one or more metrics, whether to allocate the cache line in the atomic coalescing state for the first atomic memory access.

6. The method of claim 1, wherein determining whether the first atomic memory access and the second atomic memory access are candidates for coalescing includes:
   determining whether the first atomic memory access can be coalesced with the second atomic memory access based on a symmetric access to different memory modules.

7. The method of claim 6, wherein determining whether the first atomic memory access can be coalesced with the second atomic memory access based on a symmetric access to different memory modules includes:
   determining, in response to a triggering event, whether a first cache line that includes the first atomic memory access can be coalesced with a second cache line that includes the second atomic memory access, wherein the first cache line and the second cache line are in the atomic coalescing state.

8. The method of claim 7, wherein determining, in response to a triggering event, whether a first cache line that includes the first atomic memory access can be coalesced with a second cache line that includes the second atomic memory access, wherein the first cache line and the second cache line are in the atomic coalescing state, includes:
   tracking cache lines that are candidates for coalescing.

9. The method of claim 6, wherein coalescing the first atomic memory access and the second atomic memory access in the cache line prior to requesting memory-local processing by the memory-local compute unit includes:
   coalescing the first atomic memory access and the second atomic memory access using a multi-module memory-local processing command.

10. The method of claim 1, wherein the memory-local compute unit is a processing-in-memory (PIM) unit.

11. A computing device for dynamically coalescing atomic memory operations for memory-local computing, the computing device comprising:
    a cache including a plurality of cache lines; and
    cache logic configured to:
    determine whether a first atomic memory access and a second atomic memory access are candidates for coalescing; and
    coalesce the first atomic memory access and the second atomic memory access in a cache line allocated in an atomic coalescing state prior to requesting memory-local processing by a memory-local compute unit.

12. The computing device of claim 11, wherein the cache logic is further configured to:
    determine that the first atomic memory access is a candidate for coalescing;
    store an operand of the first atomic memory access in the cache line at a location targeted by the first atomic memory access; and
    wherein determining whether the first atomic memory access and a second atomic memory access are candidates for coalescing includes:
    determining that the second atomic memory access is a candidate for coalescing with the first atomic memory access based on the operand of the first atomic memory access and an operand of the second atomic memory access.

13. The computing device of claim 12, wherein coalescing the first atomic memory access and the second atomic memory access in the cache line prior to requesting memory-local processing by the memory-local compute unit includes:

coalescing the first atomic memory access and the second atomic memory access by performing an operation of the second atomic memory access, using an operand of the second atomic memory access, on data at a location in the cache line targeted by the second atomic memory access.

14. The computing device of claim 13, wherein the cache logic is further configured to: send, to a memory controller in response to a triggering event, one or more memory-local processing commands for the first atomic memory access and the second atomic memory access.

15. The computing device of claim 11, wherein determining whether the first atomic memory access and the second atomic memory access are candidates for coalescing includes:

determining whether the first atomic memory access can be coalesced with the second atomic memory access based on a symmetric access to different memory modules.

16. The computing device of claim 15, wherein determining whether the first atomic memory access can be coalesced with the second atomic memory access based on a symmetric access to different memory modules includes:

determining, in response to a triggering event, whether a first cache line that includes the first atomic memory access can be coalesced with a second cache line that includes the second atomic memory access, wherein the first cache line and the second cache line are in the atomic coalescing state.

17. The computing device of claim 16, wherein coalescing the first atomic memory access and the second atomic memory access in the cache line prior to requesting memory-local processing by the memory-local compute unit includes:

coalescing the first atomic memory access and the second atomic memory access using a multi-module memory-local processing command.

18. A system for dynamically coalescing atomic memory operations for memory-local computing, the system comprising:

a memory device including at least one memory-local compute unit;

one or more processor cores configured to issue memory access requests; and a cache coupled to the one or more processor cores, the cache including a plurality of cache lines and cache logic, wherein the cache logic is configured to:

determine whether a first atomic memory access and a second atomic memory access are candidates for coalescing; and coalesce the first atomic memory access and the second atomic memory access in a cache line allocated in an atomic coalescing state prior to requesting memory-local processing by a memory-local compute unit.

19. The system of claim 18, wherein the cache logic is further configured to:

determine that the first atomic memory access is a candidate for coalescing;

allocate a cache line in the atomic coalescing state without loading data from memory; and store an operand of the first atomic memory access in the cache line at a location targeted by the first atomic memory access;

wherein determining whether the first atomic memory access and the second atomic memory access are candidates for coalescing includes:

determining that the second atomic memory access is a candidate for coalescing with the first atomic memory access; and wherein coalescing the first atomic memory access and the second atomic memory access in a cache prior to requesting memory-local processing by a memory-local compute unit includes:

coalescing the first atomic memory access and the second atomic memory access by performing an operation of the second atomic memory access, using an operand of the second atomic memory access, on data at a location in a cache line targeted by the second atomic memory access.

20. The system of claim 18, wherein determining whether the first atomic memory access and the second atomic memory access are candidates for coalescing includes:

determining whether the first atomic memory access can be coalesced with the second atomic memory access based on a symmetric access to different memory modules; and wherein coalescing the first atomic memory access and the second atomic memory access in the cache line prior to requesting memory-local processing by the memory-local compute unit includes:

coalescing the first atomic memory access and the second atomic memory access using a multi-module memory-local processing command.

\* \* \* \* \*